US011975533B2

(12) United States Patent
Kuramochi

(10) Patent No.: US 11,975,533 B2
(45) Date of Patent: May 7, 2024

(54) INKJET RECORDING DEVICE AND MANUFACTURING METHOD FOR SAME

(71) Applicant: KONICA MINOLTA, INC., Tokyo (JP)

(72) Inventor: Yusuke Kuramochi, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 95 days.

(21) Appl. No.: 17/792,002

(22) PCT Filed: Jan. 10, 2020

(86) PCT No.: PCT/JP2020/000650

§ 371 (c)(1),
(2) Date: Jul. 11, 2022

(87) PCT Pub. No.: WO2021/140646

PCT Pub. Date: Jul. 15, 2021

(65) Prior Publication Data

US 2023/0040662 A1 Feb. 9, 2023

(51) Int. Cl.
*B41J 2/045* (2006.01)
*B41J 2/14* (2006.01)

(52) U.S. Cl.
CPC ....... *B41J 2/04533* (2013.01); *B41J 2/14451* (2013.01); *B41J 2002/14338* (2013.01)

(58) Field of Classification Search
CPC . B41J 2/175; B41J 2/18; B41J 2/17556; B41J 2/03; B41J 2/04533; B41J 2/14451; B41J 2002/14338
See application file for complete search history.

(56) References Cited

U.S. PATENT DOCUMENTS

2007/0252860 A1* 11/2007 Nitta .................... B41J 2/17509 347/14
2008/0158320 A1* 7/2008 Nitta .................... B41J 2/17556 347/89
2019/0100024 A1* 4/2019 Yamada .................. B41J 2/165

FOREIGN PATENT DOCUMENTS

JP 2007313884 A 12/2007
JP 5728148 B2 6/2015

OTHER PUBLICATIONS

PCT International Preliminary Report on Patentability with Written Opinion of the International Searching Authority for International Application No. PCT/JP2020/000650; dated Jul. 12, 2022.

(Continued)

*Primary Examiner* — Kristal Feggins
(74) *Attorney, Agent, or Firm* — CANTOR COLBURN LLP

(57) ABSTRACT

An inkjet recording device including: inkjet head having a pressure chamber; a first pressure source to adjust ink energy per unit volume to generate "energy per unit volume" P1(Pa) relative to static ink at an atmospheric pressure at a nozzle opening height; a second pressure source to adjust ink energy per unit volume to generate "energy per unit volume" P2(Pa) relative to static ink; and a hardware processor. The first pressure source, pressure chamber, and second pressure source are connected in this order by a flow path. Assuming that a pressure loss occurring from the first pressure source to the nozzle due to circulation flow rate is ΔPa, a proportionality constant of a differential pressure (P1−P2) and ΔPa is "a", and an appropriate pressure in vicinity of the nozzle opening is Pn, the hardware processor controls pressure to establish P2={Pn−(1−a)P1}/a.

8 Claims, 3 Drawing Sheets

(56) References Cited

OTHER PUBLICATIONS

International Search Report for International Application No. PCT/JP2020/000650; dated Mar. 24, 2020.
JPO Notice of Reasons for Refusal for corresponding JP Application No. 2021-569689; Issued Jan. 30, 2024; 6 pages.

* cited by examiner

INKJET RECORDING DEVICE AND MANUFACTURING METHOD FOR SAME

CROSS REFERENCE TO RELATED APPLICATIONS

This is the U.S. national stage of application No. PCT/JP2020/000650, filed on Jan. 10, 2020. Priority of which is claimed and is also incorporated herein by reference.

TECHNICAL FIELD

The present invention relates to an inkjet recording device and a manufacturing method thereof.

BACKGROUND ART

Existing inkjet devices are known to circulate ink through an inkjet head and to eject the ink from a nozzle of the inkjet head.

According to the invention disclosed in Patent Document 1, the pressure of ink in the vicinity of the opening of a nozzle is maintained at an appropriate pressure as follows. That is, an appropriate pressure (Pn) of the ink in the vicinity of the opening of the nozzle is made at the atmospheric pressure or lower by maintaining a relation of a pressure source (P1) on an upstream side, a pressure source (P2) on a downstream side, and the appropriate pressure (Pn) in accordance with a disclosed relation formula that uses a ratio of flow path resistances on an upstream side and a downstream side of a branch point to the nozzle in an ink flow path.

CITATION LIST

Patent Literature

Patent Document 1: JP 5728148B

SUMMARY OF INVENTION

Technical Problem

Unfortunately, the relation formula of P1, P2, and Pn disclosed in Patent Document 1 is established only in a flow path structure having no branch in an ink flow path from a pressure source (P1) on an upstream side to a pressure source (P2) on a downstream side, as illustrated in FIG. 4.

In one example, the relation formula of P1, P2, and Pn disclosed in Patent Document 1 does not hold in a flow path structure in which a pressure source (P1) on an upstream side and a pressure source (P2) on a downstream side are connected by an ink flow path that branches into a flow path (flow path resistances R4 and R5) passing through a nozzle “N” and a flow path (flow path resistance R3) bypassing the nozzle “N”, as illustrated in FIG. 5.

As described above, the method disclosed in Patent Document 1 requires obtaining a relation formula of P1, P2, and Pn for each of inkjet heads having different flow path structures.

The present invention has been made in view of the above-described problem in the conventional technique, and an object of the present invention is to enable easily maintaining an appropriate ink pressure in the vicinity of an opening of a nozzle, irrespective of a flow path structure, in an inkjet recording device.

Solution to Problem

A first aspect of the present invention for solving the problem described above provides an inkjet recording device including at least one inkjet head, a first pressure source, a second pressure source, and a controller. The inkjet head has a pressure chamber that communicates with a nozzle and is configured to eject ink from the nozzle. The ink communicates with the pressure chamber.

The first pressure source is configured to adjust energy per unit volume of the ink so that the ink generates “energy per unit volume” P1(Pa), relative to static ink at the atmospheric pressure at a position having a height of an opening of the nozzle.

The second pressure source is configured to adjust energy per unit volume of the ink so that the ink generates “energy per unit volume” P2(Pa), relative to static ink at the atmospheric pressure at the position having the height of the opening of the nozzle.

The first pressure source, the pressure chamber, and the second pressure source are connected in this order by a flow path.

Assuming that a pressure loss occurring from the first pressure source to the nozzle due to a circulation flow rate is ΔPa, a constant of proportionality of a differential pressure (P1−P2) and ΔPa is “a”, and an appropriate pressure that is generated in the vicinity of the opening of the nozzle is Pn, the controller is configured to control pressure so that a relation $P2=\{Pn-(1-a)P1\}/a$ is established.

According to a second aspect of the present invention, in the inkjet recording device according to the first aspect, assuming that a limit value of P1 at which the ink overflows from the nozzle during non-circulation due to the differential pressure (P1−P2) being 0(Pa) is P11, and a limit value of P1 at which the ink overflows from the nozzle during circulation due to the differential pressure (P1−P2) being any value other than 0 is P12, a relation $\Delta Pa=|P12-P11|$ is established.

According to a third aspect of the present invention, in the inkjet recording device according to the first or the second aspect, assuming that a pressure loss occurring at the time of ejecting the ink from the nozzle is ΔPb, the diameter of the nozzle is “d”, and the surface tension of the ink is σ, Pn is a value less than 0(Pa) and greater than a value obtained from $-(4\sigma/d-a(P1-P2)-\Delta Pb)$.

According to a fourth aspect of the present invention, in the inkjet recording device according to the third aspect, assuming that a limit value of P1 at which air bubbles are caught from the nozzle at the time of non-ejection during circulation is P13, and a limit value of P1 at which air bubbles are caught from the nozzle at the time of ejection during circulation is P14, a relation $\Delta Pb=|P14-P13|$ is established.

A fifth aspect of the present invention provides a method for manufacturing an inkjet recording device. The inkjet recording device includes at least one inkjet head, a first pressure source, and a second pressure source. The inkjet head has a pressure chamber that communicates with a nozzle and is configured to eject ink from the nozzle. The ink communicates with the pressure chamber.

The first pressure source is configured to adjust energy per unit volume of the ink so that the ink generates “energy per unit volume” P1(Pa), relative to static ink at the atmospheric pressure at a position having a height of an opening of the nozzle.

The second pressure source is configured to adjust energy per unit volume of the ink so that the ink generates “energy per unit volume" P2(Pa), relative to static ink at the atmospheric pressure at the position having the height of the opening of the nozzle.

The first pressure source, the pressure chamber, and the second pressure source are connected in this order by a flow path. The method includes assuming that a pressure loss occurring from the first pressure source to the nozzle due to a circulation flow rate is ΔPa, calculating a constant of proportionality "a" of a differential pressure (P1−P2) and ΔPa. The method also includes, assuming that an appropriate pressure that is generated in the vicinity of the opening of the nozzle is Pn, designing so that a relation $P2=\{Pn-(1-a)P1\}/a$ is established.

In a sixth aspect of the present invention, the method for manufacturing the inkjet recording device according to the fifth aspect also includes, assuming that a limit value of P1 at which the ink overflows from the nozzle during non-circulation due to the differential pressure (P1−P2) being 0(Pa) is P11, and a limit value of P1 at which the ink overflows from the nozzle during circulation due to the differential pressure (P1−P2) being any value other than 0 is P12, determining P11 and P12 by varying the values P1 and P2 while maintaining the differential pressure (P1−P2) at any value, calculating ΔPa from a relation $\Delta Pa=|P12-P11|$, and calculating "a" from a correlation of the differential pressure (P1−P2) and ΔPa.

In a seventh aspect of the present invention, the method for manufacturing the inkjet recording device according to the fifth or the sixth aspect further includes, assuming that a pressure loss occurring at the time of ejecting the ink from the nozzle is ΔPb, the diameter of the nozzle is "d", and the surface tension of the ink is σ, setting Pn at a value less than 0(Pa) and greater than a value obtained from $-(4\sigma/d-a(P1-P2)-\Delta Pb)$.

In an eighth aspect of the present invention, the method for manufacturing the inkjet recording device according to the seventh aspect further includes, assuming that a limit value of P1 at which air bubbles are caught from the nozzle at the time of non-ejection during circulation is P13, and a limit value of P1 at which air bubbles are caught from the nozzle at the time of ejection during circulation is P14, determining P13 and P14 by varying the values P1 and P2 while maintaining the differential pressure (P1−P2) at any value other than 0 and calculating ΔPb from a relation $\Delta Pb=|P14-P13|$.

Advantageous Effects of Invention

The present invention enables easily maintaining an appropriate ink pressure in the vicinity of an opening of a nozzle, irrespective of a flow path structure, in an inkjet recording device.

DESCRIPTION OF EMBODIMENTS

Hereinafter, an embodiment of the present invention will be described with reference to the drawings. The following describes an embodiment of the present invention and is not intended to limit the present invention.

Figure 1:
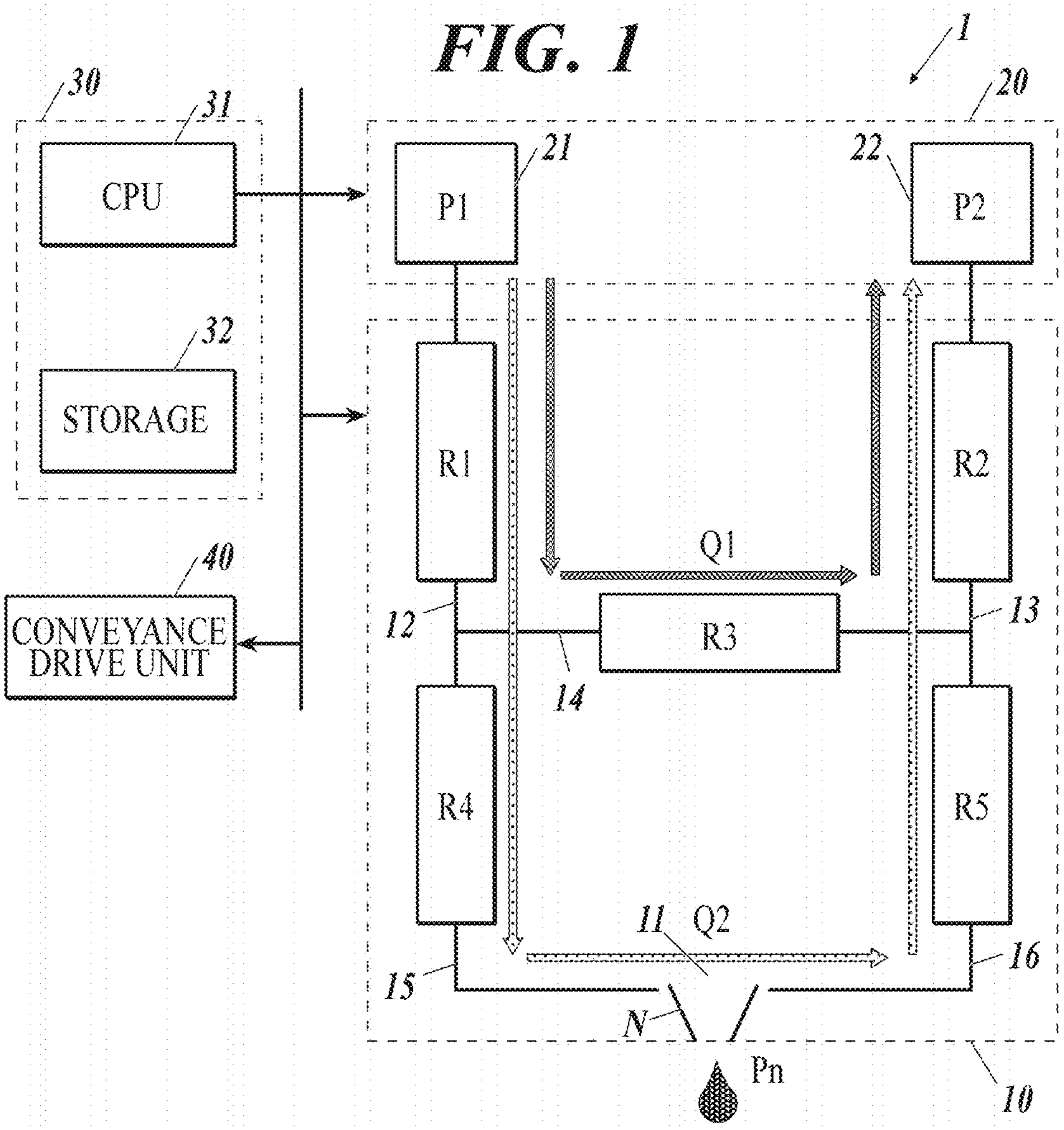
FIG. 1 is a schematic diagram illustrating main components of an inkjet recording device according to an embodiment of the present invention.

As illustrated in FIG. 1, an inkjet recording device 1 of this embodiment includes an inkjet head 10, an ink supply unit 20, a controller 30, and a conveyance drive unit 40.

The inkjet head 10 includes a nozzle "N" and a pressure chamber 11 that communicates with the nozzle "N". The inkjet head 10 performs operation such as recording operation for recording an image, etc., on a recording medium by ejecting ink from the nozzle "N". The ink communicates with the pressure chamber 11 and is ejected by the action of a drive element, such as a piezoelectric element. At least one inkjet head 10 is provided, but a plurality of inkjet heads 10 may be provided. The pressure that is generated in the vicinity of the opening of the nozzle "N" is represented as "Pn".

The conveyance drive unit 40 moves a target recording medium on which an image is to be recorded by the inkjet head 10, relative to the nozzle "N" of the inkjet head 10.

The ink supply unit 20 includes a first pressure source 21 and a second pressure source 22.

The first pressure source 21 communicates with a first flow path 12 and adjusts energy per unit volume of ink so that the ink will generate "energy per unit volume" P1(Pa), relative to static ink at the atmospheric pressure at a position having the height of the opening of the nozzle "N".

The second pressure source 22 communicates with a second flow path 13 and adjusts energy per unit volume of ink so that the ink will generate "energy per unit volume" P2(Pa), relative to static ink at the atmospheric pressure at a position having the height of the opening of the nozzle "N".

Specifically, the first pressure source 21 and the second pressure source 22 include ink chambers that are positioned at a predetermined height relative to the position having the height of the opening of the nozzle "N". The first pressure source 21 and the second pressure source 22 also include components such as an ink tank, a pump, a control valve, and a sensor, for controlling inflow and outflow of ink to the ink chamber and controlling pressure applied to a liquid surface in the ink chamber.

The controller 30 includes a central processing unit (CPU) 31 and a storage 32 and collectively controls various operations of the inkjet recording device 1. The operations of the inkjet recording device 1 to be controlled include supply and circulation of ink, image recording operation, and maintenance operation of the inkjet head 10. The CPU 31 executes a control process by performing various arithmetic calculations. The storage 32 includes, for example, a random access memory (RAM) and a nonvolatile memory. The RAM provides a working memory space to the CPU 31 and stores temporary data. The nonvolatile memory stores and holds various control programs and setting data. The nonvolatile memory is, for example, a flash memory, and may include a hard disk drive (HDD).

The flow path structure illustrated in FIG. 1 is an example and has the following configuration.

The first pressure source 21 is connected to the pressure chamber 11 via the first flow path 12 and a fourth flow path 15. The pressure chamber 11 is connected to the second pressure source 22 via a fifth flow path 16 and a second flow path 13. The connection point between the first flow path 12 and the fourth flow path 15 and the connection point between the second flow path 13 and the fifth flow path 16 are connected by a third flow path 14 without passing the pressure chamber 11.

Figure 4:
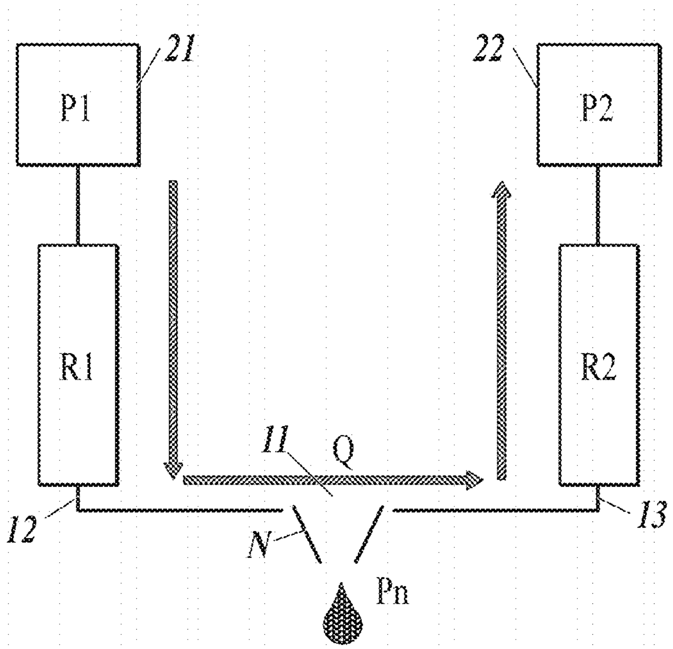
FIG. 4 is a schematic diagram illustrating an inkjet flow path structure of a conventional example.
Figure 5:
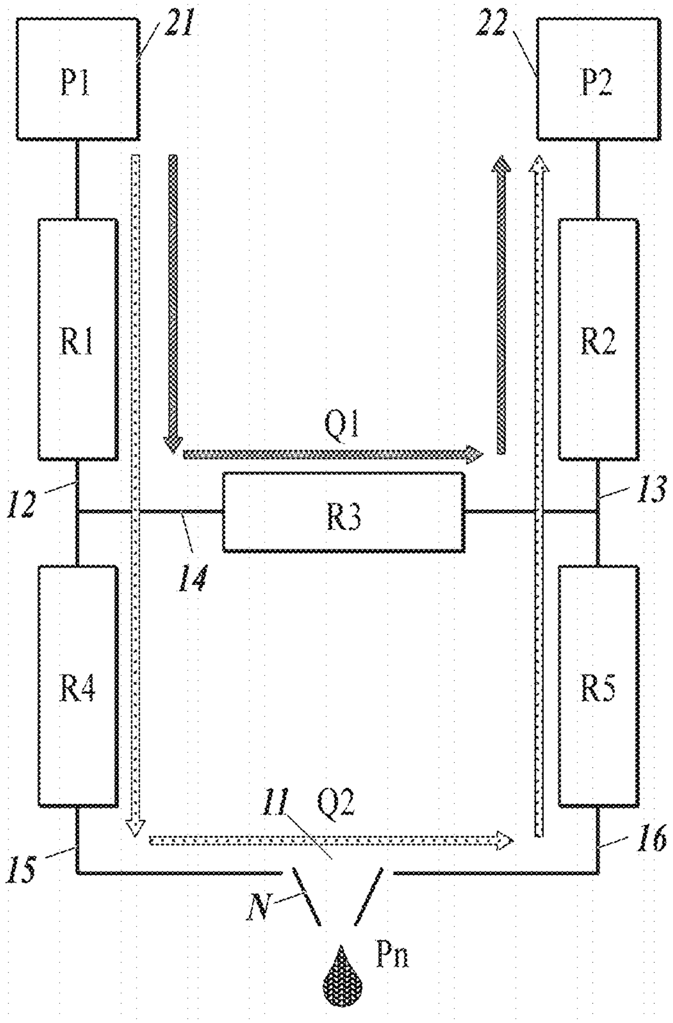
FIG. 5 is a schematic diagram illustrating an inkjet flow path structure of another conventional example.

Assuming that the flow rate in the third flow path 14 is Q1, and the flow rate in the fourth flow path 15 and the fifth flow path 16 is Q2, the flow rate in each of the first flow path 12 and the second flow path 13 is (Q1+Q2). Flow path resistances R1 to R5 of the first to the fifth flow paths are illustrated in the drawing. Note that each of the first flow path 12 and the second flow path 13 includes a head outside flow path that connects the head 10 and the pressure source (the same applies to the case in FIGS. 4 and 5).

Meanwhile, in the present invention, for the purpose of maintaining Pn at an appropriate pressure, these flow path resistances R1 to R5 are not used, and the flow path structure is not limited to that described above. For example, the present invention can be applied to various flow path structures in addition to the flow path structure illustrated in FIG. 4.

In order to maintain Pn at an appropriate pressure, the controller 30 controls the pressures P1 and P2 as described below.

That is, assuming that a pressure loss occurring from the first pressure source 21 to the nozzle "N" due to a circulation flow rate is ΔPa, a constant of proportionality of a differential pressure (P1−P2) and ΔPa is "a", and an appropriate pressure that is generated in the vicinity of the opening of the nozzle "N" is Pn, the controller 30 controls pressure so as to establish a relation P2={Pn−(1−a) P1}/a . . . (3). The controller 30 variably controls the values P1 and P2 to make them different values, in accordance with the formula (3). The controller 30 variably controls the values P1 and P2 that satisfy the relation of the formula (3), between values P1 and P2 for a high flow speed due to a high differential pressure (P1−P2) and values P1 and P2 for a low flow speed due to a low differential pressure (P1−P2), while Pn is in an appropriate range.

As to Pn, P1 is reduced due to the pressure loss ΔPa, and thus, the following formula (1) is established.

$$Pn=P1-\Delta Pa \qquad (1)$$

Definition in assuming that a constant of proportionality of the differential pressure (P1−P2) and ΔPa is "a" is represented as the formula (2).

$$\Delta Pa=a(P1-P2) \qquad (2)$$

The formula (2) is substituted into the formula (1).

$$Pn=P1-a(P1-P2)=(1-a)P1+aP2$$

This formula is further modified into the following formula:

$$P2=\{Pn-(1-a)P1\}/a \qquad (3).$$

The ΔPa has the following relation.

That is, assuming that a limit value of P1 at which ink overflows from the nozzle "N" during non-circulation due to the differential pressure (P1−P2) being 0(Pa) is P11, and a limit value of P1 at which ink overflows from the nozzle "N" during circulation due to the differential pressure (P1−P2) being any value other than 0 is P12, A relation $\Delta Pa=|P12-P11|$ (4) is established.

Figure 2:
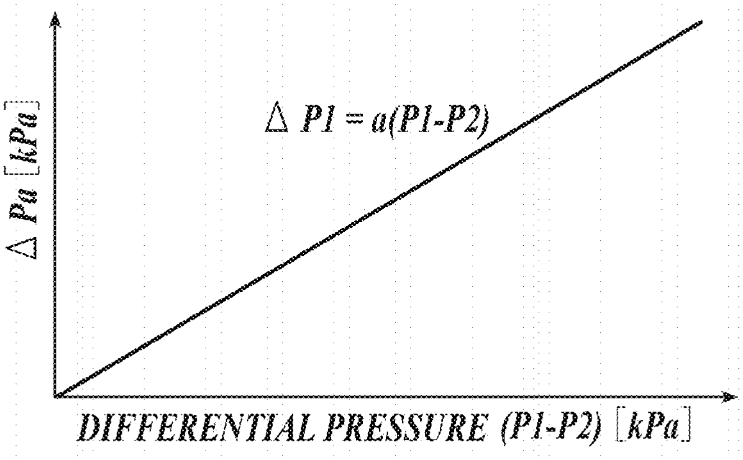
FIG. 2 is a graph according to the embodiment of the present invention, illustrating a proportional relationship of a differential pressure between a first pressure source and a second pressure source and a pressure loss generated from the first pressure source to a nozzle due to a circulation flow rate.

With the use of this relation, the constant of proportionality "a" of the differential pressure (P1−P2) and ΔPa is obtained by trials, such as experiments. FIG. 2 illustrates a graph showing the proportional relationship between the differential pressure (P1−P2) and the pressure loss ΔPa.

The P11 and P12 are determined by varying the values P1 and P2 while maintaining the differential pressure (P1−P2) at any value.

When P1 is increased (and P2 is also increased so as to have the same value as P1) while maintaining the differential pressure (P1−P2) at 0, ink reaches the limit of overflow from the nozzle "N". Thus, the value P1 at this time is used as P11.

When P1 is increased while maintaining the differential pressure (P1−P2) at each of multiple any values other than 0, ink reaches the limit of overflow from the nozzle "N". Thus, the value P1 at this time is used as P12.

The pressure losses ΔPa respectively corresponding to a plurality of differential pressures (P1−P2) are calculated from the formula (4), and the constant of proportionality "a" is calculated from a correlation of these plurality of pairs of the differential pressure (P1−P2) and ΔPa.

In the recording operation, ink is ejected from the nozzle "N" during circulation when the differential pressure (P1−P2) is any value other than 0.

Assuming that a pressure loss occurring at the time of ejecting ink from the nozzle "N" is ΔPb, the diameter of the nozzle "N" is "d", and the surface tension of the ink is σ, the appropriate pressure Pn is a value less than 0(Pa) and greater than a value obtained from −(4σ/d−a(P1−P2)−ΔPb) . . . (5).

In addition, assuming that a limit value of P1 at which air bubbles are caught from the nozzle "N" at the time of non-ejection during circulation is P13, and a limit value of P1 at which air bubbles are caught from the nozzle "N" at the time of ejection during circulation is P14, a relation ΔPb=|P14−P13| . . . (6) is established.

With the use of this relation, ΔPb is obtained by trials, such as experiments.

The P13 and P14 are determined by varying the values P1 and P2 while maintaining the differential pressure (P1−P2) at any value other than 0.

First, when ejection from the nozzle "N" is not performed, the values of P1 and P2 are varied while maintaining the differential pressure (P1−P2) at any value other than 0, to increase the degree of intake of the outside air from the nozzle "N". Then, a limit of occurrence of catching air bubbles from the nozzle "N" comes. The value of P1 at this time is used as P13.

Moreover, when ejection from the nozzle "N" is performed, the values of P1 and P2 are varied while maintaining the differential pressure (P1−P2) at any value other than 0, to increase the degree of intake of the outside air from the nozzle "N" in conjunction with reaction of ejection operation. Then, a limit of occurrence of catching air bubbles from the nozzle "N" comes. The value of P1 at this time is used as P14.

The ΔPb is calculated from the formula (6).

After ΔPb is calculated, the value of the formula (5) is determined, whereby the range of the appropriate pressure Pn is obtained.

The controller 30 controls pressure in accordance with the range of the appropriate pressure Pn, which is thus determined, and the formula (3). As a result, a meniscus that is formed at the opening of the nozzle "N" is suitably maintained.

A more detailed description will be made with reference to the pressure chart in FIG. 3.

Figure 3:
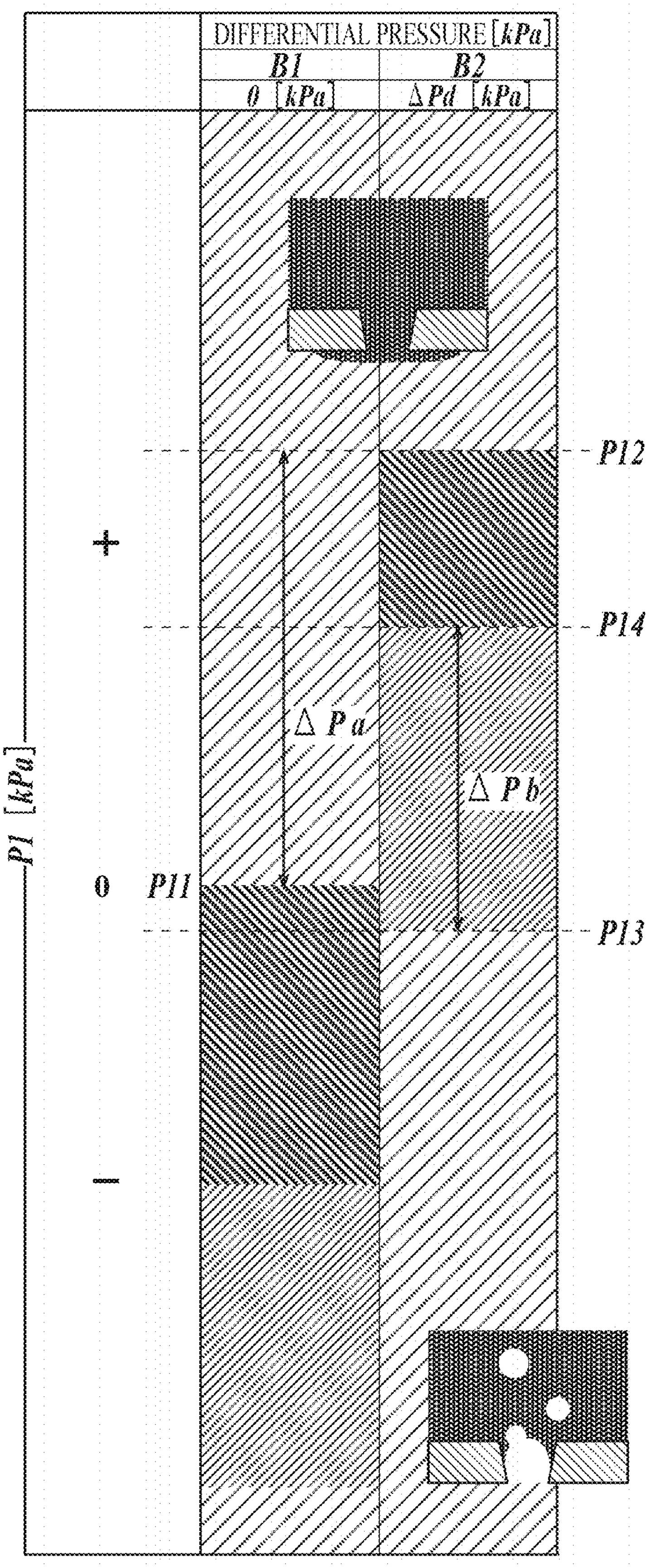
FIG. 3 is a pressure chart according to the embodiment of the present invention.

The vertical axis illustrated in FIG. 3 shows a magnitude of P1. The P1 is assumed to be of an ink supply side. The vertical bar B1 on the right side of the vertical axis shows a pressure range of each state and a boundary (limit value) of the pressure range in the condition in which the differential pressure (P1−P2) is 0 (kPa). The vertical bar B2 on the most right side shows a pressure range of each state and a boundary (limit value) of the pressure range in the condition in which the differential pressure (P1−P2) is ΔPd (kPa). Note that ΔPd≠0.

In the range over the pressure value P11 in the bar B1, ink can overflow from the nozzle "N". In the range over the pressure value P12 in the bar B2, ink can overflow from the nozzle "N". The difference between P12 and P11 corresponds to the pressure loss ΔPa that occurs from the first pressure source 21 to the nozzle "N" due to the circulation flow rate.

In the bar B1 in which the differential pressure (P1−P2) is 0 (kPa), P1=P2=Pn=0 (kPa), that is, ink can overflow from the nozzle "N" at the atmospheric pressure at the position having the height of the opening of the nozzle "N".

In the bar B2 in which the differential pressure (P1−P2) is ΔPd (kPa), due to flow of ink, there is a pressure loss ΔPa from P1 to Pn.

The pressure loss ΔPa can be calculated from the difference between the pressures P11 and P12 at the same phenomenon in which ink overflows from the nozzle "N", in the bars B1 and B2.

The pressure value P13 in the bar B2 corresponds to a limit value (static meniscus braking pressure), and air bubbles are caught if P1 falls below this limit value while ink is not ejected.

The pressure value P14 in the bar B2 corresponds to a limit value (dynamic meniscus braking pressure), and air bubbles are caught at the time of ejecting ink if P1 falls below this limit value.

Thus, the difference between P14 and P13 corresponds to the pressure loss ΔPb that occurs at the time of ejecting ink from the nozzle "N".

It is necessary to set P1 in the range of P12 to P14 in order to prevent overflow of ink from the nozzle "N" and to prevent intake of air bubbles although ink is ejected, in image recording operation. In this range, a meniscus that is formed at the opening of the nozzle "N" is maintained by the pressure 4σ/d due to the surface tension, although the pressure losses ΔPa and ΔPb occur.

Thus, the appropriate pressure Pn is less 0(Pa) and greater than the value obtained from the formula (5).

In manufacturing an inkjet recording device, the formula (3) is used after the constant of proportionality "a" and the appropriate pressure Pn are calculated as described above, and design is performed so that the relation of the formula (3) will be established. The constant of proportionality "a" does not depend on physical properties of ink on the condition that the flow path structure is the same. In consideration of this, the constant of proportionality "a" should be examined at least once with respect to the same type of inkjet heads having the same flow path structure.

The pressure chart illustrated in FIG. 3 differs depending on the setting of the differential pressure (P1−P2) during image recording operation and on physical properties of ink, and therefore, the appropriate pressure Pn is calculated for each of these conditions.

An inkjet recording device including a controller that has a control function for variably controlling P1, P2, and Pn while maintaining the relation of the formula (3), may be manufactured, or an inkjet recording device including an ink supply unit that moves so that the relation of the formula (3) will be established during operation, may be manufactured.

As described above, this embodiment enables easily maintaining an appropriate ink pressure in the vicinity of an opening of a nozzle, irrespective of a flow path structure, in an inkjet recording device.

INDUSTRIAL APPLICABILITY

The present invention can be used in inkjet recording devices.

REFERENCE SIGNS LIST

1 inkjet recording device
10 inkjet head
20 ink supply unit
21 first pressure source
22 second pressure source
30 controller
40 conveyance drive unit
N nozzle

The invention claimed is:

1. An inkjet recording device comprising:

at least one inkjet head having a pressure chamber that communicates with a nozzle and being configured to eject ink from the nozzle, the ink communicating with the pressure chamber;

a first pressure source configured to adjust energy per unit volume of the ink so that the ink generates "energy per unit volume" P1(Pa), relative to static ink at an atmospheric pressure at a position having a height of an opening of the nozzle;

a second pressure source configured to adjust energy per unit volume of the ink so that the ink generates "energy per unit volume" P2(Pa), relative to static ink at an atmospheric pressure at the position having the height of the opening of the nozzle; and a hardware processor, wherein the first pressure source, the pressure chamber, and the second pressure source are connected in this order by a flow path, assuming that a pressure loss occurring from the first pressure source to the nozzle due to a circulation flow rate is ΔPa, a constant of proportionality of a differential pressure (P1−P2) and ΔPa is "a", and an appropriate pressure that is generated in a vicinity of the opening of the nozzle is Pn, the hardware processor is configured to control pressure so that a relation P2={Pn−(1−a) P1}/a is established.

2. The inkjet recording device according to claim 1, wherein, assuming that a limit value of P1 at which the ink overflows from the nozzle during non-circulation due to the differential pressure (P1−P2) being 0(Pa) is P11, and a limit value of P1 at which the ink overflows from the nozzle during circulation due to the differential pressure (P1−P2) being any value other than 0 is P12, a relation ΔPa=|P12−P11| is established.

3. The inkjet recording device according to claim 1, wherein, assuming that a pressure loss occurring at the time of ejecting the ink from the nozzle is ΔPb, a diameter of the nozzle is "d", and a surface tension of the ink is σ, Pn is a value less than 0(Pa) and greater than a value obtained from −(4σ/d−a(P1−P2)−ΔPb).

4. The inkjet recording device according to claim 3, wherein, assuming that a limit value of P1 at which air bubbles are caught from the nozzle at the time of non-ejection during circulation is P13, and a limit value of P1 at which air bubbles are caught from the nozzle at the time of ejection during circulation is P14, a relation $\Delta Pb=|P14-P13|$ is established.

5. A method for manufacturing an inkjet recording device, the inkjet recording device comprising:

at least one inkjet head having a pressure chamber that communicates with a nozzle and being configured to eject ink from the nozzle, the ink communicating with the pressure chamber;

a first pressure source configured to adjust energy per unit volume of the ink so that the ink generates "energy per unit volume" P1(Pa), relative to static ink at an atmospheric pressure at a position having a height of an opening of the nozzle; and a second pressure source configured to adjust energy per unit volume of the ink so that the ink generates "energy per unit volume" P2(Pa), relative to static ink at an atmospheric pressure at the position having the height of the opening of the nozzle, the first pressure source, the pressure chamber, and the second pressure source being connected in this order by a flow path, the method comprising:

assuming that a pressure loss occurring from the first pressure source to the nozzle due to a circulation flow rate is $\Delta Pa$, calculating a constant of proportionality "a" of a differential pressure (P1−P2) and $\Delta Pa$; and assuming that an appropriate pressure that is generated in a vicinity of the opening of the nozzle is Pn, designing so that a relation $P2=\{Pn-(1-a)P1\}/a$ is established.

6. The method for manufacturing the inkjet recording device according to claim 5, further comprising:

assuming that a limit value of P1 at which the ink overflows from the nozzle during non-circulation due to the differential pressure (P1−P2) being 0(Pa) is P11, and a limit value of P1 at which the ink overflows from the nozzle during circulation due to the differential pressure (P1−P2) being any value other than 0 is P12, determining P11 and P12 by varying the values P1 and P2 while maintaining the differential pressure (P1−P2) at any value;

calculating $\Delta Pa$ from a relation $\Delta Pa=|P12-P11|$; and calculating "a" from a correlation of the differential pressure (P1−P2) and $\Delta Pa$.

7. The method for manufacturing the inkjet recording device according to claim 5, further comprising, assuming that a pressure loss occurring at the time of ejecting the ink from the nozzle is $\Delta Pb$, a diameter of the nozzle is "d", and a surface tension of the ink is $\sigma$, setting Pn at a value less than 0(Pa) and greater than a value obtained from $-(4\sigma/d-a(P1-P2)-\Delta Pb)$.

8. The method for manufacturing the inkjet recording device according to claim 7, further comprising:

assuming that a limit value of P1 at which air bubbles are caught from the nozzle at the time of non-ejection during circulation is P13, and a limit value of P1 at which air bubbles are caught from the nozzle at the time of ejection during circulation is P14, determining P13 and P14 by varying the values P1 and P2 while maintaining the differential pressure (P1−P2) at any value other than 0; and calculating $\Delta Pb$ from a relation $\Delta Pb=|P14-P13|$.

* * * * *